United States Patent
Kaszczuk et al.

(10) Patent No.: US 7,241,719 B2
(45) Date of Patent: Jul. 10, 2007

(54) THERMAL YELLOW DONOR AND DYES

(75) Inventors: Linda A. Kaszczuk, Webster, NY (US); Charles H. Weidner, Ontario, NY (US); Derek D. Chapman, Rochester, NY (US); Ruizheng Wang, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 240 days.

(21) Appl. No.: 10/152,859

(22) Filed: May 22, 2002

(65) Prior Publication Data

US 2003/0226219 A1   Dec. 11, 2003

(51) Int. Cl.
*B41M 5/035* (2006.01)
*B41M 5/385* (2006.01)

(52) U.S. Cl. .............. 503/227; 106/31.43; 106/31.45

(58) Field of Classification Search .................. 8/471; 503/227; 106/31.43, 31.45, 31.49
See application file for complete search history.

(56) References Cited

U.S. PATENT DOCUMENTS

| 5,081,101 A | 1/1992 | Evans et al. ............ 503/227 |
| 6,869,909 B2 * | 3/2005 | Wang et al. ............ 503/227 |

FOREIGN PATENT DOCUMENTS

| EP | 0 490 339 A | 6/1992 |
| EP | 0 490 340 A | 6/1992 |

OTHER PUBLICATIONS

R. Wang, et al, "Yellow Images with Improved Light Stability and Yellow Dyes Useful Therein", U.S. Appl. No. 10/153,536, (D-84057) filed May 22, 2002.

* cited by examiner

*Primary Examiner*—Bruce H. Hess
(74) *Attorney, Agent, or Firm*—Kathleen Neuner Manne; Lynne M. Blank

(57) ABSTRACT

Disclosed is a dye combination and thermal dye transfer imaging element and imaging method comprising a yellow dye donor containing a combination of two or more yellow dyes, the combination of dyes exhibiting an RMS error of less than 0.015. Such dye combinations provide improved color matching vs. target colors.

29 Claims, No Drawings

THERMAL YELLOW DONOR AND DYES

CROSS-REFERENCE TO RELATED APPLICATIONS

This application is one of three applications cofiled under Ser. Nos. 10/152,859, 10/153,569, and 10/153,536.

FIELD OF THE INVENTION

This invention relates to dye combinations for better spectral match to target printing inks, and more particularly to a yellow donor element comprising a combination of yellow image dyes which is used to obtain a color proof that accurately represents the hue of a printed color image obtained from a printing press.

BACKGROUND OF THE INVENTION

In order to approximate the appearance of continuous tone (photographic) images via ink-on-paper printing, the commercial printing industry relies on the process known as halftone printing. In halftone printing, color density gradations are produced by printing patterns of dots or areas of varying sizes, but of the same color density, instead of varying the color density continuously as is done in photographic printing.

There is an important commercial need to obtain a color proof image before a printing press run is made. It is desired that the color proof will accurately represent at least the details and color tone scale of the prints obtained from the printing press. In many cases, it is also desirable that the color proof accurately represent the image quality and halftone pattern of the prints obtained on the printing press. In the sequence of operations necessary to produce an ink-printed, full color picture, a proof is also required to check the accuracy of the color separation data from which the final three or more printing plates or cylinders are made. Traditionally, such color separations proofs have involved silver halide light-sensitive systems which require many exposure and processing steps before a final, full color picture is assembled.

Colorants that are used in the printing industry are insoluble pigments. By virtue of their pigment character, the spectrophotometric curves of the printing inks are often unusually sharp on either the bathochromic or hypsochromic side. This can cause problems in color proofing systems in which dyes, as opposed to pigments, are being used. It is very difficult to match the hue of a given ink using a single dye.

In U.S. Pat. No. 5,126,760, a process is described for producing a direct digital, halftone color proof of an original image on a dye-receiving element. The proof can then be used to represent a printed color image obtained from a printing press. The process described therein comprises:
 a) generating a set of electrical signals which is representative of the shape and color scale of an original image;
 b) contacting a dye-donor element comprising a support having thereon a dye layer and an infrared-absorbing material with a first dye-receiving element comprising a support having thereon a polymeric, dye image-receiving layer;
 c) using the signals to image-wise heat by means of a diode laser the dye-donor element, thereby transferring a dye image to the first dye-receiving element; and
 d) retransferring the dye image to a second dye image-receiving element which has the same substrate as the printed color image. In the above process, multiple dye-donors are used to obtain a complete range of colors in the proof. For example, for a full color proof, four colors—cyan, magenta, yellow and black are normally used.

By using the above process, the image dye is transferred by heating the dye-donor containing the infrared-absorbing material with the diode laser to volatilize the dye, the diode laser beam being modulated by the set of signals which is representative of the shape and color of the original image, so that the dye is heated to cause volatilization only in those areas in which its presence is required on the dye-receiving layer to reconstruct the original image.

Similarly, a thermal transfer proof can be generated by using a thermal head in place of a diode laser as described in U.S. Pat. No. 4,923,846. Commonly available thermal heads are not capable of generating halftone images of adequate resolution, but can produce high quality continuous tone proof images, which are satisfactory in many instances. U.S. Pat. No. 4,923,846 also discloses the choice of mixtures of dyes for use in thermal imaging proofing systems. Inkjet is also used as a low cost proofing method as described in U.S. Pat. No. 6,022,440. Likewise, an inkjet proof can be generated using combinations of either dispersed dyes in an aqueous fluid, or dissolved dyes in a solvent based system. U.S. Pat. No. 6,352,330 discloses methods for accomplishing this. Ink jet printers can also produce high quality continuous tone proof images, which by virtue of their cost are satisfactory in many instances. The dyes are selected on the basis of values for hue error and turbidity. The Graphic Arts Technical Foundation Research Report No. 38, "Color Material" (58-(5) 293–301, 1985) gives an account of this method.

An alternative and more precise method for color measurement and analysis uses the concept of uniform color space known as CIELAB, in which a sample is analyzed mathematically in terms of its spectrophotometric curve, the nature of the illuminant under which it is viewed, and the color vision of a standard observer. For a discussion of CIELAB and color measurement, see *Principles of Color Technology*, $2^{nd}$ Edition, F. W. Billmeyer, pp. 25–110, Wiley Interscience and *Optical Radiation Measurements*, Volume 2, F. Grum, pp. 33–145, Academic Press.

In using CIELAB, colors can be expressed in terms of three parameters: L*, a*, and b*, where L* is a lightness function, and a* and b* define a point in color space. Thus, a plot of a* vs. b* values for a color sample can be used to accurately show where that sample lies in color space, i.e., what its hue is. This allows different samples to be compared for hue if they have similar density and L* values.

In color proofing in the printing industry, it is important to be able to match the proofing ink references provided by the International Prepress Proofing Association. In the United States, these ink references are density patches made with standard 4-color process inks and are known as SWOP® (Specifications Web Offset Publications) color aims. In 1995, a SWOP certified press sheet, ANSI CGATS TR 001-1995, was published which is becoming the standard in the United States industry. For additional information on color measurement of inks for web offset proofing, see "Advances in Printing Science and Technology", Proceedings of the $19^{th}$ International Conference of Printing Research Institutes, Eisenstadt, Austria, June 1987, J. T Ling and R. Warner, p. 55.

It is also desirable to provide proofs which can be used in parts of the world which do not use the SWOP® aims. For example, in Japan, a different standard is used and it would be desirable to provide a closer match to Japan Color. The Japan Color aims described here are based on an average of nine different ink manufacturers yellow inks and the 2001 Japan Color/Color Sample colorimetry values currently under consideration by the Japan National Committee for ISO/TC130. Color references to Japan Color press sheet are based on measurements of actual press prints published by The Japan Print Institution.

In U.S. Pat. No. 5,081,101, the use of a mixture of dicyanomethylidene-arylidene and pyrazolone-arylidene yellow dyes in a thermal donor element is disclosed. Although the elements of the disclosure can provide the correct colorimetry as evidenced by the CIELAB Lab measurements, the combination is not sufficient to match the spectral properties of the press inks. The mismatch in spectral characteristics gives problems in that images produced by this method suffer from metamerism, a condition in which the perceived color is dependent on the illuminant under which the image is viewed.

It is a problem to be solved to provide dye combinations and thermal dye transfer donors that more accurately reproduce desired target yellow colors.

SUMMARY OF THE INVENTION

The invention provides a dye combination and thermal dye transfer imaging element and imaging method comprising a yellow dye donor containing a combination of two or more yellow dyes, the combination of dyes exhibiting an RMS error of less than 0.015. Such dye combinations provide improved color matching vs. target colors.

DETAILED DESCRIPTION OF THE INVENTION

The invention is generally described above. It is an object of this invention to improve the spectral color reproduction and thereby reduce the secondary color errors. It is yet another object of this invention to provide a mixture of yellow dyes for color proofing wherein the desired colorimetry is improved.

Yellow dyes useful in the invention are suitably chosen from dyes having the following formulas I–III.

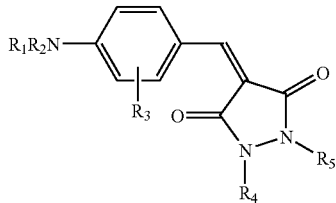

wherein:
$R_1$ is an alkyl or allyl group of from 1 to 6 carbon atoms, such as methyl, ethyl, propyl, isopropyl, butyl, pentyl, allyl, but-2-en-1-yl, 1,1-dichloropropen-3-yl, or such alkyl or allyl groups substituted with groups such as hydroxy, acyloxy, alkoxy, aryl, carboxy, carbalkoxy, cyano, acylamido, halogen, and phenyl;

$R_2$ is any of the groups as described for $R_1$, or represents the atoms which when taken together with $R_3$ form a 5- or 6-membered ring;

$R_3$ is an alkyl group as described above for $R_1$, an alkoxy group of from 1 to 6 carbon atoms, or represents the atoms which, when taken together with $R_2$, forms a 5- or 6-membered ring;

$R_4$ is an alkyl group as described above for $R_1$, or an aryl group of from 6 to 10 carbon atoms such as phenyl, naphthyl, p-tolyl, m-chlorophenyl, p-methoxyphenyl, m-bromophenyl, and o-tolyl; and $R_5$ is any of the groups as described for $R_4$.

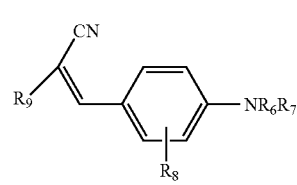

wherein:
$R_6$ is an alkyl or allyl group of from 1 to 6 carbon atoms, such as methyl, ethyl, propyl, isopropyl, butyl, pentyl, allyl, but-2-en-1-yl, 1,1-dichloropropen-3-yl, or such alkyl or allyl groups substituted with groups such as hydroxy, acyloxy, alkoxy, aryl, carboxy, carbalkoxy, cyano, acylamido, halogen, or phenyl groups;

$R_7$ is any of the groups as described for $R_6$, or represents the atoms which when taken together with $R_8$ forms a 5- or 6-membered ring;

$R_8$ is an alkyl group as described above for $R_1$, an alkoxy group of from 1 to 6 carbon atoms, or represents the atoms which, when taken together with $R_7$, forms a 5- or 6-membered ring; and $R_9$ is cyano or —$CONR_{10}R_{11}$, where $R_{10}$ and $R_{11}$ each independently represents an alkyl group having from 1 to 6 carbon atoms; a cycloalkyl group of from 5 to 7 carbon atoms; an allyl group; an aryl group of from 6 to 10 carbon atoms such as phenyl, naphthyl, p-tolyl, m-chlorophenyl, p-methoxyphenyl, m-bromophenyl, or o-tolyl groups; or a heteroaryl group of from 5 to 10 atoms, such as 2-thienyl, 2-pyridyl, or 2-furyl.

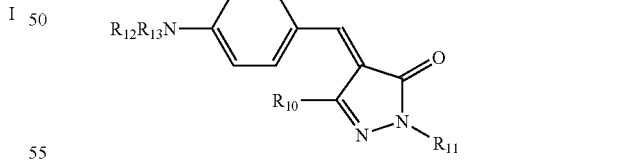

wherein:
$R_{10}$ represents methyl; an alkoxy group having from 1 to 10 carbon atoms, such as methoxy, ethoxy, methoxyethoxy, or 2-cyanoethoxy; an aryloxy group having from 6 to 10 carbon atoms such as phenoxy or naphthoxy; acyl; carbonamido; carboalkoxy; or an amino group;

$R_{11}$ represents an alkyl group of from 1 to 10 carbon atoms; a cycloalkyl group of from 5 to 7 carbon atoms; or an aryl group of from 6 to 10 carbon atoms; and $R_{12}$ and $R_{13}$ each independently represent alkyl groups having from 1 to 6 carbon atoms; a cycloalkyl group of from 5 to 7 carbon atoms; an allyl group; an aryl group of from 6 to 10 carbon atoms such as phenyl, naphthyl, p-tolyl, m-chlorophenyl, p-methoxyphenyl, m-bromophenyl, or o-tolyl; or a heteroaryl group of from 5 to 10 atoms, such as 2-thienyl, 2-pyridyl, or 2-furyl.

Also useful as an additional dye is a dye of formula IV:

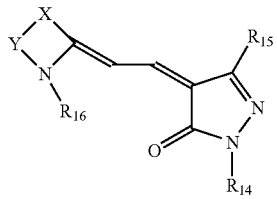

IV wherein:

$R_{14}$ represents methyl; an alkoxy group having from 1 to 10 carbon atoms, such as methoxy, ethoxy, methoxyethoxy, or 2-cyanoethoxy; an aryloxy group having from 6 to 10 carbon atoms such as phenoxy or naphthoxy; acyl; carbamido; carboalkoxy; or an amino group;

$R_{15}$ represents an alkyl group of from 1 to 10 carbon atoms; a cycloalkyl group of from 5 to 7 carbon atoms; or an aryl group of from 6 to 10 carbon atoms;

$R_{16}$ represents an alkyl group having from 1 to 10 carbon atoms; a cycloalkyl group of from 5 to 7 carbon atoms; an allyl group; aryl group of from 6 to 10 carbon atoms such as phenyl, naphthyl, p-tolyl, m-chlorophenyl, p-methoxyphenyl, m-bromophenyl, or o-tolyl; or a heteroaryl group of from 5 to 10 atoms, such as 2-thienyl, 2-pyridyl, or 2-furyl; and X represents $C(CH_3)_2$, S, O, or $NR_{15}$.

A suitable infrared dye useful in the invention for an IR donor is an infrared-absorbing material of formula V:

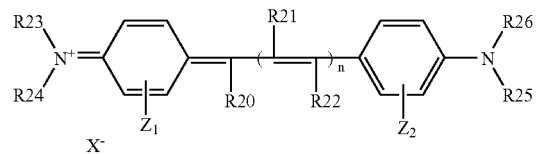

V wherein:

$R_{20}$, $R_{21}$, and $R_{22}$ each independently represents hydrogen, halogen, cyano, alkoxy, aryloxy, acyloxy, aryloxycarbonyl, alkoxycarbonyl, sulfonyl, carbamoyl, acyl, acylamido, alkylamino, arylamino, or a substituted or unsubstituted alkyl, aryl, or a heteroaryl group; or any two of said $R_{20}$, $R_{21}$, and $R_{22}$ groups may be joined together or with an adjacent aromatic ring to complete a 5- to 7-membered carbocyclic or heterocyclic ring group;

$R_{23}$, $R_{24}$, $R_{25}$, and $R_{26}$ each independently represents hydrogen, an alkyl or cycloalkyl group having from 1 to 6 carbon atoms or an aryl or heteroaryl group having from about 5 to 10 atoms;

or $R_{23}$, $R_{24}$, $R_{25}$, and $R_{26}$ may be joined together to form a 5- to 7-membered heterocyclic ring;

or $R_{23}$, $R_{24}$, $R_{25}$, and $R_{26}$ may be joined to the carbon atom of the adjacent aromatic ring at a position ortho to the position of attachment of the anilino nitrogen to form, along with the nitrogen to which they are attached, a 5- or 6-membered heterocyclic ring group;

n is 1 to 5;

X is a monovalent anion; and $Z_1$ and $Z_2$ each independently represents the groups of $R_{20}$ or the atoms necessary to complete a 5- to 7-membered fused carbocyclic or heterocyclic ring.

Useful yellow dyes within the scope of formula I include the following:

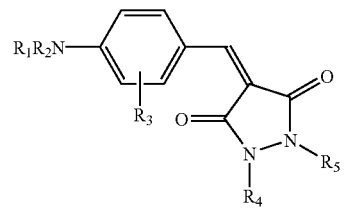

I

| Dye | $R_1$ | $R_2$ | $R_3$ | $R_4$ | $R_5$ |
|---|---|---|---|---|---|
| Ia | $C_2H_5$ | $C_2H_5$ | H | $C_6H_5$ | $C_2H_5$ |
| Ib | $C_2H_5$ | —$C(CH_3)_2CH_2CH(CH_3)$— | | $C_6H_5$ | $C_2H_5$ |
| Ic | $CH_3$ | $CH_3$ | 2-$CH_3$ | $C_6H_5$ | $C_2H_5$ |
| Id | $CH_2C_6H_5$ | $CH_2C_6H_5$ | H | $C_6H_5$ | $C_2H_5$ |
| Ie | $C_2H_5$ | $C_2H_5$ | H | $C_6H_5$ | $C_4H_9$ |
| If | $C_2H_5$ | $C_2H_5$ | H | $C_6H_5$ | $CH_2CH=CH_2$ |
| Ig | $C_2H_5$ | $C_2H_5$ | H | $C_6H_5$ | $CH_2CH_2C(O)OCH_3$ |
| Ih | $C_2H_5$ | $C_2H_5$ | H | $C_6H_5$ | $CH_2C(O)OCH_2CH_3$ |

Useful yellow dyes within the scope of formula II include the following:

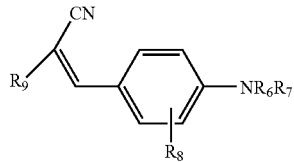

II

| Dye | $R_6$ | $R_7$ | $R_8$ | $R_9$ |
|---|---|---|---|---|
| IIa | $C_2H_5$ | $C_2H_5$ | H | CN |
| IIb | $C_2H_5$ | $C_2H_5$ | 2-$CH_3$ | CN |
| IIc | $CH_2C_6H_5$ | $CH_2C_6H_5$ | H | CN |
| IId | $C_2H_5$ | —$C(CH_3)_2CH_2CH(CH_3)$— | | CN |
| IIe | $C_2H_5$ | $CH_2C_6H_5$ | H | CN |
| IIf | $C_2H_5$ | $CH_2C_6H_5$ | H | $C(O)NHCH_2C_6H_5$ |
| IIg | $C_2H_5$ | $C_2H_5$ | H | $C(O)NHCH_2C_6H_5$ |
| IIh | $CH_2C_6H_5$ | $CH_2C_6H_5$ | H | $C(O)NHCH_2C_6H_5$ |
| IIj | $CH_2C_6H_5$ | $CH_2C_6H_5$ | H | $C(O)N(C_2H_5)CH_2C_6H_5$ |
| IIk | $C_2H_5$ | $C_2H_5$ | H | $C(O)OCH_2C_6H_5$ |
| IIm | $C_2H_5$ | $C_2H_5$ | H | $C(O)OCH_2CH_3$ |
| IIn | $CH_2C_6H_5$ | $CH_2C_6H_5$ | H | $C(O)OCH_2CH_3$ |
| IIo | $C_2H_5$ | $CH_2C_6H_5$ | H | $C(O)OCH_2CH_3$ |
| IIp | $CH_2C(O)OC_2H_5$ | $CH_2C(O)OC_2H_5$ | H | CN |
| IIq | $C_2H_5$ | $(CH_2)_2OC(O)NHC_6H_5$ | 3-$CH_3$ | CN |

The above dyes and synthetic procedures for making these are disclosed in U.S. Pat. Nos. 3,247,211 and 5,081,101, the disclosure of which are hereby incorporated by reference.

Useful yellow dyes within the scope of formula III include the following:

III

| Dye | $R_{10}$ | $R_{11}$ | $R_{12}$ | $R_{13}$ |
|---|---|---|---|---|
| IIIa | $OC_2H_5$ | $C_6H_5$ | $C_2H_5$ | $C_2H_5$ |
| IIIb | $OC_2H_5$ | $C_6H_5$ | $CH_2C_6H_5$ | $CH_2C_6H_5$ |
| IIIc | $OC_2H_5$ | $C_6H_5$ | $CH_2C_6H_5$ | $C_2H_5$ |
| IIId | $N(CH_3)_2$ | $C_6H_5$ | $C_2H_5$ | $C_2H_5$ |
| IIIe | $N(CH_3)_2$ | $C_6H_5$ | $CH_2C_6H_5$ | $CH_2C_6H_5$ |
| IIIf | $N(C_2H_5)_2$ | $C_6H_5$ | $C_2H_5$ | $C_2H_5$ |
| IIIg | $CH_3$ | $C_6H_5$ | $C_2H_5$ | $C_2H_5$ |
| IIIh | $C(O)CH_3$ | $C_6H_5$ | $C_2H_5$ | $C_2H_5$ |
| IIIj | $C(O)OCH_3$ | $C_6H_5$ | $C_2H_5$ | $C_2H_5$ |
| IIIk | $N(CH_3)_2$ | 4-$ClC_6H_4$ | $C_2H_5$ | $C_2H_5$ |

The above dyes and synthetic procedures for making these are disclosed in U.S. Pat. No. 4,866,029, the disclosure of which is hereby incorporated by reference.

Useful dyes within the scope of formula IV include the following:

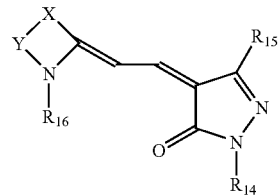

IV

| Dye | $R_{14}$ | $R_{15}$ | $R_{16}$ | X | Y |
|---|---|---|---|---|---|
| IVa | $C_6H_5$ | $OC_2H_5$ | $C_2H_5$ | S | $C_6H_4$ |
| IVb | $C_6H_5$ | $N(CH_3)_2$ | $C_2H_5$ | S | $C_6H_4$ |
| IVc | $C_6H_5$ | $OC_2H_5$ | $CH_3$ | S | $C_6H_4$ |
| IVd | $C_6H_5$ | $N(CH_3)_2$ | $CH_3$ | S | $C_6H_4$ |
| IVe | $C_6H_5$ | $N(CH_3)_2$ | $C_2H_5$ | $C(CH_3)_2$ | $C_6H_4$ |
| IVf | $C_6H_5$ | $OC_2H_5$ | $C_2H_5$ | $C(CH_3)_2$ | $C_6H_4$ |
| IVg | $C_6H_5$ | $N(CH_3)_2$ | $CH_3$ | $C(CH_3)_2$ | $C_6H_4$ |
| IVh | $C_6H_5$ | $OC_2H_5$ | $CH_3$ | $C(CH_3)_2$ | $C_6H_4$ |
| IVj | $C_6H_5$ | $CH_3$ | $CH_3$ | $C(CH_3)_2$ | $C_6H_4$ |
| IVk | $C_6H_5$ | $C(O)CH_3$ | $C_2H_5$ | $C(CH_3)_2$ | $C_6H_4$ |
| IVm | $C_6H_5$ | $C(O)OCH_3$ | $C_2H_5$ | $C(CH_3)_2$ | $C_6H_4$ |

Useful infrared absorbing materials of structure V are disclosed in U.S. Pat. No. 4,950,639, columns 3–7, the disclosure of which is hereby incorporated. Dyes of structure Va and Vb, as shown below, are useful:

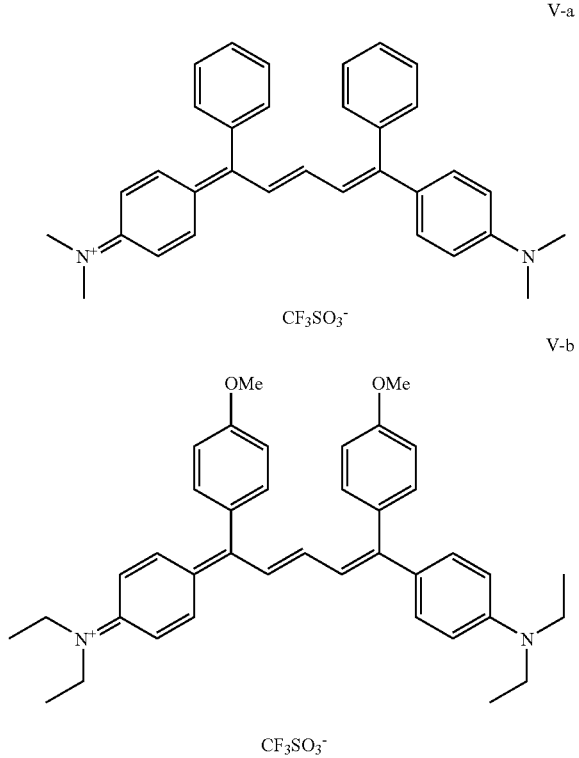

Unless otherwise specifically stated, use of the term "group", "substituted" or "substituent" means any group or radical other than hydrogen. Additionally, when reference is made in this application to a compound or group that contains a substitutable hydrogen, it is also intended to encompass not only the unsubstituted form, but also its form further substituted with any substituent group or groups as herein mentioned, so long as the substituent does not destroy properties necessary for the intended utility. Suitably, a substituent group may be halogen or may be bonded to the remainder of the molecule by an atom of carbon, silicon, oxygen, nitrogen, phosphorous, or sulfur. The substituent may be, for example, halogen, such as chloro, bromo or fluoro; nitro; hydroxyl; cyano; carboxyl; or groups which may be further substituted, such as alkyl, including straight or branched chain or cyclic alkyl, such as methyl, trifluoromethyl, ethyl, t-butyl 3-(2,4-di-t-pentylphenoxy)propyl, cyclohexyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentylphenoxy)acetamido, alpha-(2,4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecylphenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropylsulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxypbenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired desirable properties for a specific application and can include, for example, hydrophobic groups, solubilizing groups, blocking groups, and releasing or releasable groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

EXAMPLE 1

Individual yellow dye-donor elements were prepared by coating on a 100 μm poly(ethylene terephthalate) support a dye layer containing a mixture of one or more yellow dyes, the infrared-absorbing bis(aminoaryl)polymethine dye as described in U.S. Pat. No. 4,950,639 (column 2 lines 3–68 and column 3 lines 1–3) at 0.046 g/m² in either polyvinylbutyral binder (BS18 from Wacker Chemie or B72 from Solutia) at 0.41 g/m² or cellulose acetate-propionate (CAP 482-20 from Eastman Chemical) at 0.41 g/m². The following experimental ratios shown in Table 1 were used in laydowns as listed, with the dry coverage referring to that of the image dyes used:

TABLE 1

| Yellow Dye-Donor | Dye II$_q$ (wt %) | Dye II$_f$ (wt %) | Dye I$_g$ (wt %) | IR Dye | Binder | Dry Coverage (g/m²) |
|---|---|---|---|---|---|---|
| Y-1 | 24.3 | 37.8 | 37.8 | V-b | CAP | 0.398 |
| Y-2 | 22.6 | 45.2 | 32.3 | V-b | CAP | 0.334 |
| Y-3 | 24.2 | 37.9 | 37.9 | V-b | CAP | 0.355 |
| Y-4 | 24.3 | 37.8 | 37.8 | V-b | CAP | 0.398 |
| Y-5 | 24.2 | 37.9 | 37.9 | V-b | CAP | 0.355 |
| Y-6 | 21.7 | 43.5 | 34.8 | V-a | B72 | 0.248 |

Control 1, C-1, for comparative purposes was Kodak Approval® Yellow Digital Color Proofing Film CAT# 1187038. An intermediate dye-receiving element, Kodak Approval® Intermediate Color Proofing Film, CAT# 1067560, was used with the above dye-donor elements to print an image. For the monochrome magenta images, the power to the laser array was modulated to produce a continuous tone image of uniform exposure steps of varying density as described in U.S. Pat. No. 4,876,235. After the exposure, the intermediate receiver was laminated to Tokuryo Art (Mitsubishi) paper which had been previously laminated with Kodak Approval® Prelaminate, P01.

All measurements of the yellow images were made using an X-Rite 938 portable spectrophotometer set for D$_{50}$ illuminant and 2° observer angle. Readings were made with black backing behind the samples. The CIELAB L* a* b* coordinates reported are interpolated to a Status T density of 1.01.

The color differences between the samples can be expressed as ΔE, where ΔE is the vector difference in CIELAB color space between the laser thermal generated image and the Japan Color aim.

$$\Delta E = \sqrt{((L^*_e - L^*_s)^2 + (a^*_e - a^*_s)^2 + (b^*_e - b^*_s)^2)}$$

Hue angle = 360 − arctan $b^*/a^*$ for negative values of $b^*$

= arctan $b^*/a^*$ for positive values of $b^*$ wherein subscript e represents the measurements from the experimental materials and subscript s represents the measurements from the Japan Color aim.

Table 2 summarizes the results obtained. The 2001 Japan Color/Color Sample colorimetry values currently under consideration by the Japan National Committee for ISO/TC130 were used as the color reference.

TABLE 2

| Yellow Dye-Donor | L* | a* | b* | ΔE | Hue Angle | ΔHue Angle |
|---|---|---|---|---|---|---|
| Japan Color | 87.90 | −7.50 | 91.50 | — | 94.7 | — |
| Y-1 | 88.1 | −7.46 | 92.03 | 0.6 | 94.6 | −0.1 |
| Y-2 | 87.3 | −6.72 | 90.52 | 1.4 | 94.2 | −0.5 |
| Y-3 | 87.4 | −7.17 | 91.09 | 0.7 | 94.5 | −0.2 |
| Y-4 | 88.1 | −7.28 | 91.90 | 0.5 | 94.5 | −0.2 |
| Y-5 | 87.9 | −7.15 | 91.44 | 0.38 | 94.5 | −0.2 |
| Y-6 | 84.8 | −3.54 | 90.07 | 5.3 | 92.2 | −2.5 |

EXAMPLE 2

Individual yellow dye-donor elements were prepared by coating on a 100 μm poly(ethylene terephthalate) support a dye layer containing a mixture yellow dyes, the infrared-absorbing bis(aminoaryl)polymethine dye as described in U.S. Pat. No. 4,950,639 (column 2 lines 3–68 and column 3 lines 1–3) at 0.054 g/m² in a polyvinylbutyral binder (Butvar B-72) at 0.38 g/m² for Y-7 and Y-8, and 0.45 for Y-9. The following experimental ratios shown in Table 3 were used in laydowns as list:

TABLE 3

| Yellow Dye-Donor | Featured dye | Featured dye (wt %) | Dye II$_q$ (wt %) | Dye I$_g$ (wt %) | Add'l Dye (wt %) | Dry Coverage (g/m²) |
|---|---|---|---|---|---|---|
| Y-7 | II$_p$ | 31.91% | 20.21% | III$_d$ 39.36% | 8.51% | 0.2947 |
| Y-8 | II$_f$ | 45.27% | 13.75% | III$_d$ 31.81% | 3.20% | 0.3668 |
| Y-9 | II$_p$ | 32.44% | 20.39% | IVe 39.97% | 7.20% | 03652 |

Control 1, C-1, for comparative purposes was Kodak Approval® Yellow Digital Color Proofing Film CAT# 1187038. An intermediate dye-receiving element, Kodak Approval® Intermediate Color Proofing Film, CAT# 1067560, was used with the above dye-donor element to print an image as in Example 1. After the exposure, the intermediate receiver was laminated to 60# TextWeb™ (Deferient Paper Company) paper which had been previously laminated with Kodak Approval® Prelaminate, P02.

The SWOP and ANSI CGATS TR 001-1995 comparison measurements of the yellow image was made using a Gretag SPM100 portable spectrophotometer set for D$_{50}$ illuminant and 2° observer angle. All readings were made with black backing behind the samples. The CIELAB L* a* b* coordinates reported are interpolated to a Status T density of 0.98 for comparison with a SWOP certified press sheet (00-15-162), except for the control at both 0.98 and 0.90 Status T density, and at a 1.0 Status T density for comparison against the publication ANSI-CGATS TR 001-1995.

TABLE 4

| Yellow Dye-Donor | L* | a* | b* | ΔE | Hue Angle | ΔHue Angle |
|---|---|---|---|---|---|---|
| SWOP Certified Press Sheet 00-15-162 | 84.06 | −5.29 | 82.73 | — | 93.66 | — |
| Y-7 | 84.80 | −5.27 | 82.60 | 0.75 | 93.65 | −0.01 |
| Y-8 | 85.07 | −4.83 | 83.20 | 1.23 | 93.32 | −0.34 |
| Y-9 | 84.54 | −5.11 | 82.04 | 0.86 | 93.56 | −0.10 |
| Control-1 (0.90 density) | 84.44 | −6.52 | 81.89 | 1.53 | 94.55 | 0.89 |
| Control-1 (0.98 density) | 83.49 | −4.80 | 86.08 | 3.43 | 93.19 | −0.47 |
| ANSI CGATS TR 001 1995 | 84.26 | −5.79 | 84.33 | — | 93.93 | — |
| Y-7 | 84.72 | −5.14 | 84.06 | 0.96 | 93.50 | −0.43 |
| Y-8 | 85.01 | −4.74 | 84.62 | 1.32 | 93.21 | −0.72 |
| Y-9 | 84.43 | −5.00 | 83.35 | 0.78 | 93.43 | −0.50 |
| Control-1 | 83.29 | −4.34 | 87.07 | 4.51 | 92.85 | −1.08 |

All inventive examples demonstrate a lower delta E compared to the control when printed at a similar density to either the certified press sheet or TR 001 report. The above data also shows that the control needs to be printed at a significantly lower density than the ink in order to approach the correct color. When the control is printed at the same density as the ink, the color error is unacceptable. When trying to match a press aim, the customer must use a significantly lower proof density to match the color, so the proof is no longer a true density representation of what to expect on press.

The above cited examples were also compared in terms of RMS Error against the "target" specified color aims, using the earlier defined formula. The results are summarized below in Table 5.

TABLE 5

| Yellow Examples | RMS Error for Japan Color |
|---|---|
| Y-1 | 0.00135 |
| Y-2 | 0.00166 |
| Y-3 | 0.00129 |
| Y-4 | 0.00177 |
| Y-5 | 0.00170 |
| Y-6 | 0.00376 |
| C-1 | 0.05198 |

As can be seen from the data above, examples of the invention display a smaller RMS error, thus providing a closer spectral match to the target ink aims.

A similar comparison was run for the SWOP certified Press Aim in Table 6 below:

TABLE 6

| Yellow Examples | RMS Error for SWOP Certified Press Sheet 00-15-162 |
|---|---|
| Y-7 | 0.00227 |
| Y-8 | 0.00227 |
| Y-9 | 0.00218 |
| C-1 (0.90 density) | 0.04391 |
| C-1 (0.98 density) | 0.06045 |

As can be seen from the data above, examples of the invention display a significantly smaller RMS error and correlate to a significantly closer spectral match to the target ink aims.

The entire contents of the patents and other publications referred to in this specification are incorporated herein by reference.

What is claimed is:

1. A thermal dye transfer imaging donor element comprising a yellow dye donor containing a combination of two or more yellow dyes, the combination of yellow dyes exhibiting an RMS error of less than 0.015, wherein at least two of the yellow dyes are selected from a dyes of Formula I, II or III:

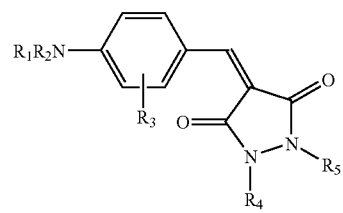

I wherein:
  $R_1$ is an alkyl or allyl group of from 1 to 6 carbon atoms;
  $R_2$ is any of the groups as described for $R_1$, or represents the atoms which when taken together with $R_3$ form a 5- or 6-membered ring;
  $R_3$ is an alkyl group as described above for $R_1$, an alkoxy group of from 1 to 6 carbon atoms, or represents the atoms which, when taken together with $R_2$, forms a 5- or 6-membered ring;
  $R_4$ is an alkyl group as described above for $R_1$, or an aryl group of from 6 to 10 carbon atoms; and
  $R_5$ is any of the groups as described for $R_4$;

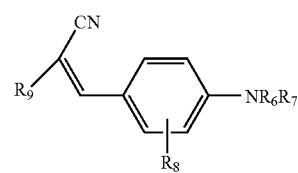

II wherein:
  $R_6$ is an alkyl or allyl group of from 1 to 6 carbon atoms;
  $R_7$ is any of the groups as described for $R_6$, or represents the atoms which when taken together with $R_8$ forms a 5- or 6-membered ring;
  $R_8$ is an alkyl group as described above for $R_1$, an alkoxy group of from 1 to 6 carbon atoms, or represents the atoms which, when taken together with $R_7$, forms a 5- or 6-membered ring; and
  $R_9$ is cyano or $-CONR_{10}R_{11}$, where $R_{10}$ and $R_{11}$ each independently represents an alkyl group having from 1 to 6 carbon atoms; a cycloalkyl group of from 5 to 7 carbon atoms; an allyl group; an aryl group of from 6 to 10 carbon atoms or a heteroaryl group of from 5 to 10 atoms;

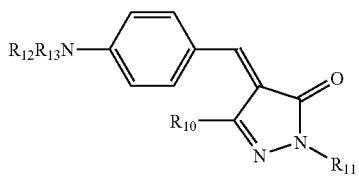

wherein:

$R_{10}$ represents methyl; an alkoxy group having from 1 to 10 carbon atoms; an aryloxy group having from 6 to 10 carbon atoms; or an acyl, carbamido, carboalkoxy, or amino group;

$R_{11}$ represents an alkyl group of from 1 to 10 carbon atoms; a cycloalkyl group of from 5 to 7 carbon atoms; or an aryl group of from 6 to 10 carbon atoms; and $R_{12}$ and $R_{13}$ each independently represent alkyl groups having from 1 to 6 carbon atoms; a cycloalkyl group of from 5 to 7 carbon atoms; an allyl group; an aryl group of from 6 to 10 carbon atoms; or a heteroaryl group of from 5 to 10 atoms.

2. The element of claim 1 wherein the RMS error is less than 0.010.

3. The element of claim 1 wherein the RMS error is less than 0.005.

4. The element of claim 1 wherein at least one yellow dye is of formula II, wherein each $R_6$ and $R_7$ is an alkyl group and $R_9$ is a cyano, carbamoyl, or alkoxycarbonyl group.

5. The element of claim 1 comprising yellow dyes represented by each of formulas I, II and III.

6. The element of claim 1 comprising an additional dye of formula IV:

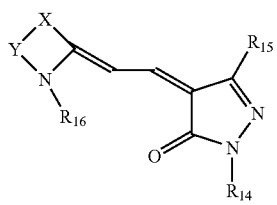

wherein:

$R_{14}$ represents methyl; an alkoxy group having from 1 to 10 carbon atoms, an aryloxy group having from 6 to 10 carbon atoms; or an acyl; carbamido; carboalkoxy; or amino group;

$R_{15}$ represents an alkyl group of from 1 to 10 carbon atoms; a cycloalkyl group of from 5 to 7 carbon atoms; or an aryl group of from 6 to 10 carbon atoms; and $R_{16}$ represents an alkyl group having from 1 to 10 carbon atoms; a cycloalkyl group of from 5 to 7 carbon atoms; an allyl group; an aryl group of from 6 to 10 carbon atoms; or a heteroaryl group of from 5 to 10 atoms;

Y represents $C_6H_4$; and

X represents $C(CH_3)_2$, S, O, or $NR_{15}$.

7. The element of claim 1 further comprising an IR dye.

8. The element of claim 7 wherein the IR dye is of the formula V:

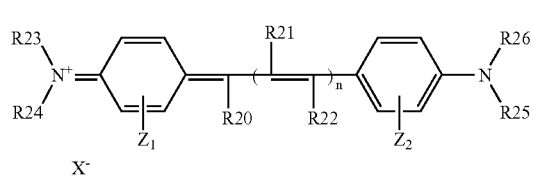

wherein:

$R_{20}$, $R_{21}$, and $R_{22}$ each independently represents hydrogen, halogen, cyano, alkoxy, aryloxy, acyloxy, aryloxycarbonyl, alkoxycarbonyl, sulfonyl, carbamoyl, acyl, acylamido, alkylamino, arylamino, alkyl, aryl, or a heteroaryl group; or any two of said $R_{20}$, $R_{21}$, and $R_{22}$ groups may be joined together or with an adjacent aromatic ring to complete a 5- to 7-membered carbocyclic or heterocyclic ring group;

$R_{23}$, $R_{24}$, $R_{25}$, and $R_{26}$ each independently represents hydrogen, an alkyl or cycloalkyl group having from 1 to 6 carbon atoms or an aryl or heteroaryl group having from about 5 to 10 atoms;

or $R_{23}$, $R_{24}$, $R_{25}$, and $R_{26}$ may be joined together to form a 5- to 7-membered heterocyclic ring;

or $R_{23}$, $R_{24}$, $R_{25}$, and $R_{26}$ may be joined to the carbon atom of the adjacent aromatic ring at a position ortho to the position of attachment of the anilino nitrogen to form, along with the nitrogen to which they are attached, a 5- or 6-membered heterocyclic ring group;

n is 1 to 5;

X is a monovalent anion; and $Z_1$ and $Z_2$ each independently represents $R_{20}$ or the atoms necessary to complete a 5- to 7-membered fused carbocyclic or heterocyclic ring.

9. A method of forming an image comprising imagewise transferring a dye from the element of claim 1 to a receiving element.

10. A method of forming an image comprising imagewise transferring a dye from the element of claim 1 via dye sublimation to a receiving element.

11. A combination of dyes useful for forming a yellow image comprising at least two yellow dyes and exhibiting an RMS error of less than 0.015, wherein at least two of the yellow dyes are selected from dyes of formula I, II, or III:

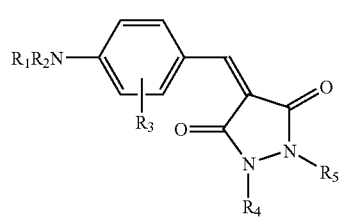

wherein:

$R_1$ is an alkyl or allyl group of from 1 to 6 carbon atoms;

$R_2$ is any of the groups as described for $R_1$, or represents the atoms which when taken together with $R_3$ form a 5- or 6-membered ring;

R$_3$ is an alkyl group as described above for R$_1$, an alkoxy group of from 1 to 6 carbon atoms, or represents the atoms which, when taken together with R$_2$, forms a 5- or 6-membered ring;

R$_4$ is an alkyl group as described above for R$_1$, or an aryl group of from 6 to 10 carbon atoms; and R$_5$ is any of the groups as described for R$_4$;

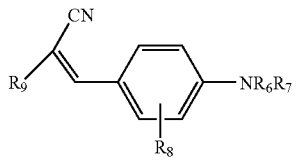

II wherein:

R$_6$ is an alkyl or allyl group of from 1 to 6 carbon atoms;

R$_7$ is any of the groups as described for R$_6$, or represents the atoms which when taken together with R$_8$ forms a 5- or 6-membered ring;

R$_8$ is an alkyl group as described above for R$_1$, an alkoxy group of from 1 to 6 carbon atoms, or represents the atoms which, when taken together with R$_7$, forms a 5- or 6-membered ring; and R$_9$ is cyano or —CONR$_{10}$R$_{11}$, where R$_{10}$ and R$_{11}$ each independently represents an alkyl group having from 1 to 6 carbon atoms; a cycloalkyl group of from 5 to 7 carbon atoms; an allyl group; an aryl group of from 6 to 10 carbon atoms or a heteroaryl group of from 5 to 10 atoms;

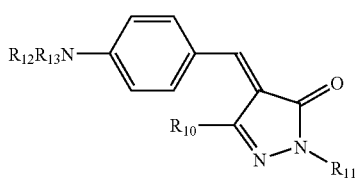

III wherein:

R$_{10}$ represents methyl; an alkoxy group having from 1 to 10 carbon atoms; an aryloxy group having from 6 to 10 carbon atoms; or an acyl, carbamido, carboalkoxy, or amino group;

R$_{11}$ represents an alkyl group of from 1 to 10 carbon atoms; a cycloalkyl group of from 5 to 7 carbon atoms; or an aryl group of from 6 to 10 carbon atoms; and R$_{12}$ and R$_{13}$ each independently represent alkyl groups having from 1 to 6 carbon atoms; a cycloalkyl group of from 5 to 7 carbon atoms; an allyl group; an aryl group of from 6 to 10 carbon atoms; or a heteroaryl group of from 5 to 10 atoms.

12. The combination of claim 11 wherein the RMS error is less than 0.010.

13. The combination of claim 11 wherein the RMS error is less than 0.005.

14. The combination of claim 11 wherein the combination includes at least three yellow dyes.

15. The combination of claim 11 wherein at least one of the yellow dyes is of formula II, where each R$_6$ and R$_2$ is an alkyl group and R$_9$ is a cyano, carbamoyl, or alkoxycarbonyl group.

16. The combination of claim 11 comprising yellow dyes represented by each of formulas I, II and III.

17. The combination of claim 11 comprising an additional dye of formula IV:

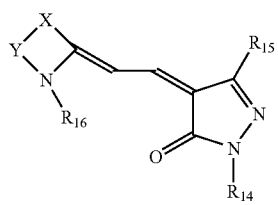

IV wherein:

R$_{14}$ represents methyl; an alkoxy group having from 1 to 10 carbon atoms, an aryloxy group having from 6 to 10 carbon atoms; or an acyl; carbamido; carboalkoxy; or amino group;

R$_{15}$ represents an alkyl group of from 1 to 10 carbon atoms; a cycloalkyl group of from 5 to 7 carbon atoms; or an aryl group of from 6 to 10 carbon atoms;

R$_{16}$ represents an alkyl group having from 1 to 10 carbon atoms; a cycloalkyl group of from 5 to 7 carbon atoms; an allyl group; an aryl group of from 6 to 10 carbon atoms; or a heteroaryl group of from 5 to 10 atoms;

Y represents C$_6$H$_4$; and

X represents C(CH$_3$)$_2$, S, O, or NR$_{15}$.

18. A thermal dye transfer imaging donor element comprising a yellow dye donor containing a combination of two or more yellow dyes, the combination of yellow dyes exhibiting an RMS error of less than 0.015, and further comprising an IR dye, wherein at least one of the yellow dyes is selected from a dye of Formula I, II or III:

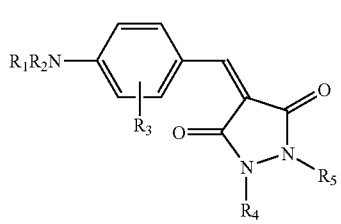

I wherein:

R$_1$ is an alkyl or allyl group of from 1 to 6 carbon atoms;

R$_2$ is any of the groups as described for R$_1$, or represents the atoms which when taken together with R$_3$ form a 5- or 6-membered ring;

R$_3$ is an alkyl group as described above for R$_1$, an alkoxy group of from 1 to 6 carbon atoms, or represents the atoms which, when taken together with R$_2$, forms a 5- or 6-membered ring;

$R_4$ is an alkyl group as described above for $R_1$, or an aryl group of from 6 to 10 carbon atoms; and $R_5$ is any of the groups as described for $R_4$;

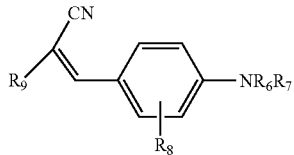

II wherein:

$R_6$ is an alkyl or allyl group of from 1 to 6 carbon atoms;

$R_7$ is any of the groups as described for $R_6$, or represents the atoms which when taken together with $R_8$ forms a 5- or 6-membered ring;

$R_8$ is an alkyl group as described above for $R_1$, an alkoxy group of from 1 to 6 carbon atoms, or represents the atoms which, when taken together with $R_7$, forms a 5- or 6-membered ring; and $R_9$ is cyano or —$CONR_{10}R_{11}$, where $R_{10}$ and $R_{11}$ each independently represents an alkyl group having from 1 to 6 carbon atoms; a cycloalkyl group of from 5 to 7 carbon atoms; an allyl group; an aryl group of from 6 to 10 carbon atoms or a heteroaryl group of from 5 to 10 atoms;

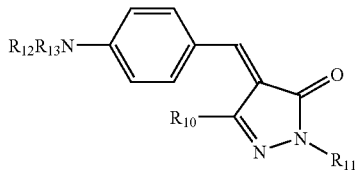

III wherein:

$R_{10}$ represents methyl; an alkoxy group having from 1 to 10 carbon atoms; an aryloxy group having from 6 to 10 carbon atoms; or an acyl, carbamido, carboalkoxy, or amino group;

$R_{11}$ represents an alkyl group of from 1 to 10 carbon atoms; a cycloalkyl group of from 5 to 7 carbon atoms; or an aryl group of from 6 to 10 carbon atoms; and $R_{12}$ and $R_{13}$ each independently represent alkyl groups having from 1 to 6 carbon atoms; a cycloalkyl group of from 5 to 7 carbon atoms; an allyl group; an aryl group of from 6 to 10 carbon atoms; or a heteroaryl group of from 5 to 10 atoms.

19. The element of claim 18, wherein the IR dye is of the formula V:

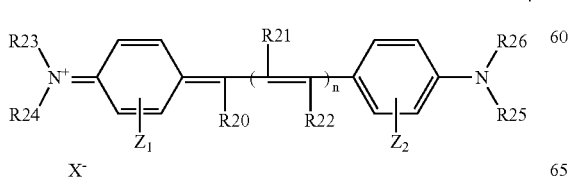

V wherein:

$R_{20}$, $R_{21}$, and $R_{22}$ each independently represents hydrogen, halogen, cyano, alkoxy, aryloxy, acyloxy, aryloxycarbonyl, alkoxycarbonyl, sulfonyl, carbamoyl, acyl, acylamido, alkylamino, arylamino, alkyl, aryl, or a heteroaryl group; or any two of said $R_{20}$, $R_{21}$, and $R_{22}$ groups may be joined together or with an adjacent aromatic ring to complete a 5- to 7-membered carbocyclic or heterocyclic ring group;

$R_{23}$, $R_{24}$, $R_{25}$, and $R_{26}$ each independently represents hydrogen, an alkyl or cycloalkyl group having from 1 to 6 carbon atoms or an aryl or heteroaryl group having from about 5 to 10 atoms;

or $R_{23}$, $R_{24}$, $R_{25}$, and $R_{26}$ may be joined together to form a 5- to 7-membered heterocyclic ring;

or $R_{23}$, $R_{24}$, $R_{25}$, and $R_{26}$ may be joined to the carbon atom of the adjacent aromatic ring at a position ortho to the position of attachment of the anilino nitrogen to form, along with the nitrogen to which they are attached, a 5- or 6-membered heterocyclic ring group;

n is 1 to 5;

X is a monovalent anion; and $Z_1$ and $Z_2$ each independently represents $R_{20}$ or the atoms necessary to complete a 5- to 7-membered fused carbocyclic or heterocyclic ring.

20. A thermal dye transfer imaging donor element comprising a yellow dye donor containing a combination of two or more yellow dyes, the combination of yellow dyes exhibiting an RMS error of less than 0.015, and further comprising an IR dye, wherein the IR dye is of the formula V:

wherein:

$R_{20}$, $R_{21}$, and $R_{22}$ each independently represents hydrogen, halogen, cyano, alkoxy, aryloxy, acyloxy, aryloxycarbonyl, alkoxycarbonyl, sulfonyl, carbamoyl, acyl, acylamido, alkylamino, arylamino, alkyl, aryl, or a heteroaryl group; or any two of said $R_{20}$, $R_{21}$, and $R_{22}$ groups may be joined together or with an adjacent aromatic ring to complete a 5- to 7-membered carbocyclic or heterocyclic ring group;

$R_{23}$, $R_{24}$, $R_{25}$, and $R_{26}$ each independently represents hydrogen, an alkyl or cycloalkyl group having from 1 to 6 carbon atoms or an aryl or heteroaryl group having from about 5 to 10 atoms;

or $R_{23}$, $R_{24}$, $R_{25}$, and $R_{26}$ may be joined together to form a 5- to 7-membered heterocyclic ring;

or $R_{23}$, $R_{24}$, $R_{25}$, and $R_{26}$ may be joined to the carbon atom of the adjacent aromatic ring at a position ortho to the position of attachment of the anilino nitrogen to form, along with the nitrogen to which they are attached, a 5- or 6-membered heterocyclic ring group;

n is 1 to 5;

X is a monovalent anion; and $Z_1$ and $Z_2$ each independently represents $R_{20}$ or the atoms necessary to complete a 5- to 7-membered fused carbocyclic or heterocyclic ring.

21. The element of claim 20 wherein the RMS error is less than 0.010.

22. The element of claim 20 wherein the RMS error is less than 0.005.

23. The element of claim 20 containing an additional dye of formula IV:

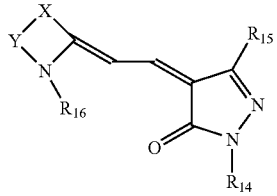

wherein:
R$_{14}$ represents methyl; an alkoxy group having from 1 to 10 carbon atoms, an aryloxy group having from 6 to 10 carbon atoms; or an acyl; carbamido; carboalkoxy; or amino group;

R$_{15}$ represents an alkyl group of from 1 to 10 carbon atoms; a cycloalkyl group of from 5 to 7 carbon atoms; or an aryl group of from 6 to 10 carbon atoms; and R$_{16}$ represents an alkyl group having from 1 to 10 carbon atoms; a cycloalkyl group of from 5 to 7 carbon atoms; an allyl group; an aryl group of from 6 to 10 carbon atoms; or a heteroaryl group of from 5 to 10 atoms; and X represents C(CH$_3$)$_2$, S, O, or NR$_{15}$.

24. A method of forming an image comprising imagewise transferring a dye from the element of claim 20 to a receiving element.

25. A method of forming an image comprising imagewise transferring a dye from the element of claim 20 via dye sublimation to a receiving element.

26. A combination of dyes useful for forming a yellow image comprising at least two yellow dyes, wherein the combination exhibits an RMS error of less than 0.015, wherein the combination includes at least three yellow dyes, and wherein the combination comprises a yellow dye represented by each of formulas I, II and III:

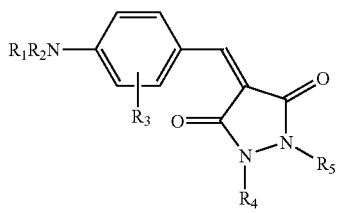

wherein:
R$_1$ is an alkyl or allyl group of from 1 to 6 atoms;

R$_2$ is any of the groups as described for R$_1$, or represents the atoms which when taken together with R$_3$ form a 5- or 6-membered ring;

R$_3$ is an alkyl group as described above for R$_1$, an alkoxy group of from 1 to 6 carbon atoms, or represents the atoms which, when taken together with R$_2$, forms a 5- or 6-membered ring;

R$_4$ is an alkyl group as described above for R$_1$, or an aryl group of from 6 to 10 carbon atoms; and R$_2$ is any of the groups as described for R$_4$;

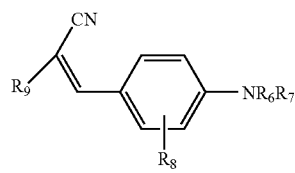

wherein:
R$_6$ is an alkyl or allyl group of from 1 to 6 carbon atoms;

R$_7$ is any of the groups as described for R$_6$, or represents the atoms which when taken together with R$_8$ forms a 5- or 6-membered ring;

R$_8$ is an alkyl group as described above for R$_1$, an alkoxy group of from 1 to 6 carbon atoms, or represents the atoms which, when taken together with R$_7$, forms a 5- or 6-membered ring; and R$_9$ is cyano or —CONR$_{10}$R$_{11}$, where R$_{10}$ and R$_{11}$ each independently represents an alkyl group having from 1 to 6 carbon atoms; a cycloalkyl group of from 5 to 7 carbon atoms; an allyl group; an aryl group of from 6 to 10 carbon atoms or a heteroaryl group of from 5 to 10 atoms;

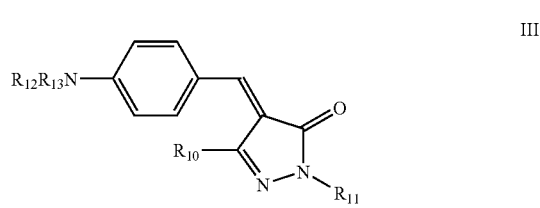

wherein:
R$_{10}$ represents methyl; an alkoxy group having from 1 to 10 carbon atoms; an aryloxy group having from 6 to 10 carbon atoms; or an acyl, carbonamido carboalkoxy or amino group;

R$_{11}$ represents an alkyl group of from 1 to 10 carbon atoms; a cycloalkyl group of from 5 to 7 carbon atoms; or an aryl group of from 6 to 10 carbon atoms; and R$_{12}$ and R$_{13}$ each independently represent alkyl groups having from 1 to 6 carbon atoms; a cycloalkyl group of from 5 to 7 carbon atoms; an allyl group; an aryl group of from 6 to 10 carbon atoms; or a heteroaryl group of from 5 to 10 atoms.

27. The combination of claim 26 wherein the RMS error is less than 0.010.

28. The combination of claim 26 wherein the RMS error is less than 0.005.

29. The combination of claim 26 containing an additional dye of formula IV:

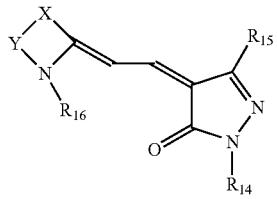

wherein:
$R_{14}$ represents methyl; an alkoxy group having from 1 to 10 carbon atoms, an aryloxy group having from 6 to 10 carbon atoms; or an acyl; carbamido; carboalkoxy; or amino group;

$R_{15}$ represents an alkyl group of from 1 to 10 carbon atoms; a cycloalkyl group of from 5 to 7 carbon atoms; or an aryl group of from 6 to 10 carbon atoms;

$R_{16}$ represents an alkyl group having from 1 to 10 carbon atoms; a cycloalkyl group of from 5 to 7 carbon atoms; an allyl group; an aryl group of from 6 to 10 carbon atoms; or a heteroaryl group of from 5 to 10 atoms; and X represents $C(CH_3)_2$, S, O, or $NR_{15}$.

* * * * *

UNITED STATES PATENT AND TRADEMARK OFFICE
CERTIFICATE OF CORRECTION

PATENT NO. : 7,241,719 B2
APPLICATION NO. : 10/152859
DATED : July 10, 2007
INVENTOR(S) : Linda A. Kaszczuk et al.

Page 1 of 1

It is certified that error appears in the above-identified patent and that said Letters Patent is hereby corrected as shown below:

| | |
|---|---|
| Column 14, Line 15 | In Claim 1, after "from" delete "a". |
| Column 18, Line 35 | In Claim 17, after "atoms;" (second occurrence) insert -- and --. |
| Column 21, Line 64 | In Claim 26, after "6" insert -- carbon --. |
| Column 22, Line 8 | In Claim 26, delete "$R_2$" and insert -- $R_5$ --. |
| Column 22, Line 53 | In Claim 26, delete "carbonamido" and insert -- carbamido, --. |

Signed and Sealed this
Twenty-ninth Day of March, 2011

David J. Kappos
*Director of the United States Patent and Trademark Office*